United States Patent [19]

Speedie

[11] 3,913,618
[45] Oct. 21, 1975

[54] VALVE
[75] Inventor: Robert Speedie, Carnegie, Australia
[73] Assignee: Illinois Tool Works Inc., Chicago, Ill.
[22] Filed: June 5, 1974
[21] Appl. No.: 476,356

[30] Foreign Application Priority Data
June 13, 1973 Australia.............................. 3648/73

[52] U.S. Cl. ........... 137/610; 137/612; 137/625.11; 137/625.46
[51] Int. Cl. .......................................... F16k 11/02
[58] Field of Search .................... 251/294, 298–304, 251/310; 137/625.4, 625.42, 625.44, 625.46, 610, 612, 625.11, 625.13, 625.15

[56] References Cited
UNITED STATES PATENTS

| 790,313 | 5/1905 | Redman.......................... 137/625.11 |
| 870,377 | 11/1907 | Marett................................. 251/301 |
| 2,204,885 | 5/1950 | Chamberlin .................... 137/625.44 |
| 2,534,577 | 12/1950 | Courtot........................... 137/625.42 |
| 2,702,050 | 2/1955 | Thomas .............................. 251/310 |
| 2,850,041 | 9/1958 | Radanof............................. 251/310 |
| 3,096,788 | 7/1963 | Talbot et al. ................... 137/625.42 |
| 3,506,239 | 4/1970 | Johnson............................. 251/310 |
| 3,538,953 | 11/1970 | Berger ............................. 137/625.46 |

Primary Examiner—William R. Cline
Assistant Examiner—H. Jay Spiegel
Attorney, Agent, or Firm—Robert W. Beart; Jack R. Halvorsen

[57] ABSTRACT

The invention relates to a tap or valve, for use in an automobile heater system or the like, having a housing with a valve chamber therein, an inlet to the valve chamber, two outlets from the valve chamber one of which constitutes a by-pass, and an operating valve member mounted for arcuate movement in the valve chamber, the operating valve member having a crank and a flexible roller closure member mounted on the crank so as to be freely rotatable thereon, and the inner ends of the two outlets being spaced equally from the axis of arcuate movement of the operating valve member so that the flexible roller closure member may seat selectively on and close the inner end of either of the two outlets.

Preferably the inlet to the valve chamber leads through the or a journal of the operating valve member, and the valve chamber is so shaped that the flexible roller closure member engages with part of the inner surface of the valve chamber as it travels from one outlet to the other.

4 Claims, 4 Drawing Figures

U.S. Patent   Oct. 21, 1975   3,913,618
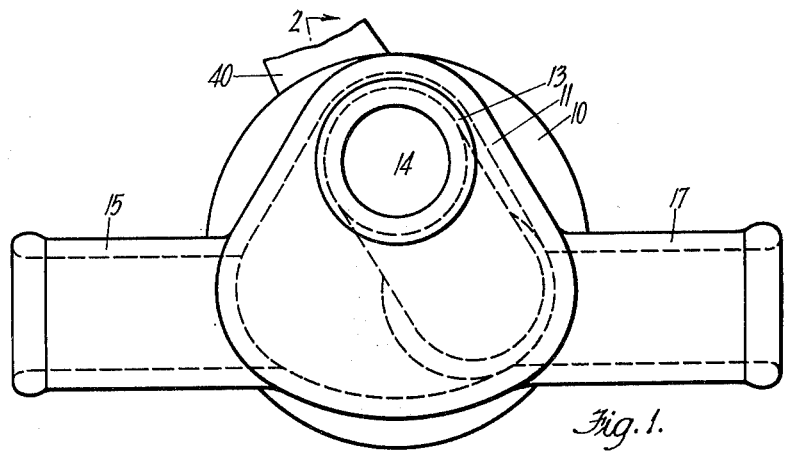
Fig. 1.
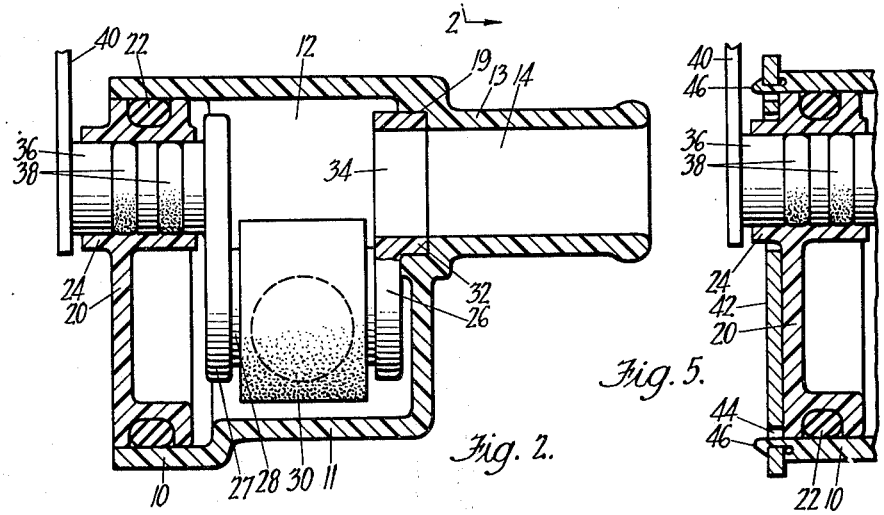
Fig. 2.
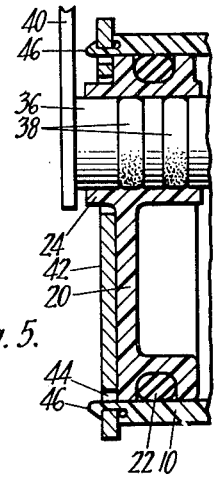
Fig. 5.
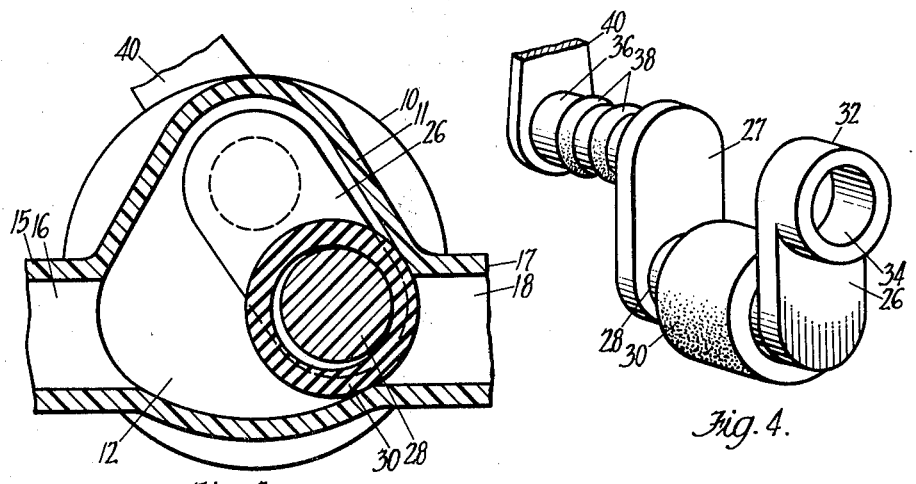
Fig. 3.
Fig. 4.

VALVE

This invention relates to an improved tap or valve and it refers particularly but not exclusively to a tap or valve for use in an automobile heater system wherein it may be required to bypass the flow of heating water flowing into the tap rather than to shut off the flow completely.

The invention has been devised particularly with the object of providing a tap or valve having means for directing the flow of fluid through an outlet opening, and for shutting off the flow of fluid through the outlet and by-passing it to some other apparatus - as by recirculating the heating fluid of an automobile heater system.

A further object is to provide a tap or valve for the purpose stated which will be of relatively simple construction, easy to make and easy to assemble.

According to the invention there is provided a tap or valve having a housing provided with a valve chamber therein, an inlet opening to the valve chamber, an outlet opening and a bypass opening leading from the valve chamber, and an operating valve member mounted for arcuate movement in the valve chamber, the operating valve member having a crank carrying a flexible roller closure member and the outlet and bypass openings being spaced equally from the axis of arcuate movement of the crank so that the closure member may seat selectively on and close either the outlet opening or the bypass opening.

It is preferred that the roller closure member be mounted loosely on the crank so that, in use, the roller will move on the crank pin and the surfaces engaging about the outlet and bypass openings will vary from time to time, with the result that there will be less wear in that roller. For this purpose the inner surface of the valve chamber is preferably so shaped that the roller closure member will engage with and run on part of that inner surface as it travels from the outlet opening to the bypass opening and back again.

Further, the housing may be made with the central axis of the inlet opening at right angles to the line of the axis of the outlet and bypass openings, which preferably are in coaxial alignment, and the inner end of the inlet opening may constitute a bearing for the operating valve member, the parts being so arranged that in assembly the operating valve member is fitted into the valve chamber with a hollow journal at one end journalled in the bearing at the inner end of the inlet opening and a plate having a journal bearing is then fitted over an open end of the housing to close the valve chamber and provide a bearing for a shaft at the other end of the operating valve chamber.

In order that the invention may be clearly understood and readily put into practical form a preferred construction of the valve or tap will be described with reference to the accompanying illustrative drawings wherein:

FIG. 1 is a side elevation of the valve or tap;

FIG. 2 shows a transverse cross-section on the line and in the direction of the arrows 2—2 of FIG. 1;

FIG. 3 is a longitudinal cross-section through the tap, showing the tap in the 'ON' position;

FIG. 4 illustrates the actuating valve member in perspective; and

FIG. 5 shows a modified construction of the tap housing.

Referring initially to FIGS. 1 to 4 the valve or tap has a housing comprising two portions 10 and 11 of unitary construction, the housing portion 11 having an internal valve chamber 12 and provided with an inlet member 13 with an inlet passageway 14 through it, an outlet member 15 with an outlet passageway 16 through it and a bypass member 17 with a bypass passageway 18 through it, all said passageways leading into the valve chamber 12. The axial direction of the inlet passageway 14 is at right angles to the axial direction of the passageways 16 and 18, and said latter passageways are in coaxial alignment and of the same diameter. The inner end of the inlet passageway is counterbored at 19 to constitute a bearing for a journal at one end of the actuating valve member. The inner ends of the outlet and bypass passageways 16 and 18 are equidistant from the central axis of the inlet passageway 14 — see FIG. 3.

The housing portion 10 is of substantially circular shape and in it is mounted an end plate 20 having a sealing ring 22 in its perimeter and a journal bearing 24 which, when the end plate 20 is mounted in the housing portion 10, is in axial alignment with the inlet passageway 14 and the bearing 19 at its inner end.

The actuating valve member has two crank arms 26 and 27 connected by a crank pin 28 on which a roller 30 of resilient material is mounted, a hollow axle or journal 32 extending outwardly from the crank arm 26 — the journal 32 being of a diameter to fit rotatably in the bearing 19 and having through it an opening 34 of substantially the same diameter as the passageway 14 — and a shaft or journal 36 extending from the crank arm 27 in coaxial alignment with the journal 32 and having two sealing rings 38 mounted in circumferential grooves in its surface. When the parts of the tap or valve are assembled that shaft or journal 36 is rotatably mounted in the journal bearing 24 and an operating lever 40 is mounted on its outer end.

In operation the tap is connected in an automobile heater system with the inlet, outlet and bypass members 13, 15 and 17 connected to appropriate pipe lines and the lever 40 connected to a control member. When it is desired to provide heat to the interior of the automobile the lever 40 is actuated so that the crank pin 28 and roller 30 are moved towards the bypass passageway 18 and the roller 30 is pressed into engagement with the opening into the valve chamber 12 at the inner end thereof, said opening being shaped to receive the roller neatly so that a sealing engagement is effected. The roller 30 is made a diameter and length such that it will seal that opening, and the pressure of fluid flowing through the inlet 14 to the outlet 16 will press the roller 30 on to its seating to ensure an effective seal.

When it is desired to shut off the heater the lever 40 is moved in the direction to cause the pin 28 and roller 30 to swing towards the inner end of the outlet passageway 16 and into engagement with the opening into the valve chamber 12 at the inner end thereof, which is similarly shaped so that a sealing engagement is effected. By reason of the construction of the valve means, as described above, the roller 30 will seal both openings equally well.

It is to be noted that when the crank is in the 'closed' position, as shown in FIG. 3, the centre line of the crank pin 28 is above the central axis of the passageway 18 (similarly in relation to the passageway 16) and the fluid pressure within the valve chamber 12 tends to press the lower portion of the roller 30, where it is free of the crank pin, into the passageway. The diameter of the pin 28 is greater than that of the passageway.

In the modification illustrated in FIG. 5 a plate 42 is provided to fit over the open end of the housing portion 10 and said plate has a series of circularly arranged openings 44 adapted to receive detents 46 provided around the rim of the housing portion 10 thereby to hold the plate 42 in position. The plate 42 may be a closure plate or it may be part of a bracket for mounting the valve or tap assembly in position.

The roller 30, being a loose fitting on the crank pin 28, tends to rotate on that crank pin 28 with the result that the one surface of the roller is not presented to the outlet opening each time the outlet is closed, and similarly for the bypass opening, and there is longer life in the roller and in the tap or valve itself. The roller may be made of synthetic rubber or other suitable resilient material. To assist that rotation of the roller 30 the inner surface of the valve chamber 12 directly between the outlet and bypass openings is arcuate in shape so that in its travel the roller 30 engages with and runs on that arcuate inner surface and is caused to turn on the crank pin 28.

Although the tap or valve is designed particularly for use in automobile heater systems its use is not limited thereto.

It is to be understood minor modifications in details of design and/or construction may be made without departing from the ambit of the invention as defined by the appended claims.

I claim:

1. A valve comprising a housing having a valve chamber therein, first and second outlet passageways having inner ends which lead into said valve chamber, an inlet passageway intermediate said outlet passageways and having an inner end which leads into said valve chamber intermediate said inner ends of said outlet passageways, a crank comprising a crank pin, a first crank arm journalled in said housing and a second crank arm journalled in said inner end of said inlet passageway, said second crank arm having an inlet aperture therethrough which leads into said inlet passageway, a flexible roller on said crank pin which has a diameter sufficient to shut off the inner end of either of said outlet means and a control member secured to said first crank arm for controlling the position of said roller with respect to said inner ends of said outlet passageways so as to selectively control which of said outlet pipes is to receive flow therethrough.

2. A valve as claimed in claim 1 wherein an inner surface of said housing of an arcuate shape lies between said inner ends of said outlet passageways and said roller engages and rolls upon said surface as said crank pin is moved between said inner ends of said outlet passageways by said control member.

3. A valve as claimed in claim 1 wherein said outlet passageways are coaxial, said inlet passageway is approximately centered between said inner ends of said outlet passageways and said roller is disposed substantially parallel to said inlet passageway.

4. A valve as claimed in claim 3 wherein an inner surface of said housing of an arcuate shape lies between said inner ends of said outlet passageways and said roller engages and rolls upon said surface as said crank pin is moved between said inner ends of said outlet passageways by said control member.

* * * * *